United States Patent
Wycech

[11] Patent Number: 6,165,588
[45] Date of Patent: Dec. 26, 2000

[54] REINFORCEMENT OF HOLLOW SECTIONS USING EXTRUSIONS AND A POLYMER BINDING LAYER

[75] Inventor: Joseph S. Wycech, Grosse Pointe Woods, Mich.

[73] Assignee: Henkel Corporation, Gulph Mills, Pa.

[21] Appl. No.: 09/145,657

[22] Filed: Sep. 2, 1998

[51] Int. Cl.[7] .................................................. B32B 3/04
[52] U.S. Cl. ........................ 428/122; 52/793.1; 293/109; 293/120; 293/136; 296/188; 296/205; 428/71; 428/119; 428/120; 428/137
[58] Field of Search ................................... 428/122, 119, 428/71, 120, 137; 52/793.1; 296/188, 205; 293/120, 109, 136

[56] References Cited

U.S. PATENT DOCUMENTS

| | | | |
|---|---|---|---|
| 3,123,170 | 3/1964 | Bryant | 180/68 |
| 3,493,257 | 2/1970 | Fitzgerald et al. | 296/901 |
| 3,905,478 | 9/1975 | Peterson | 428/119 |
| 4,090,734 | 5/1978 | Iami et al. | 296/146 |
| 4,238,540 | 12/1980 | Yates et al. | 428/36.1 |
| 4,397,490 | 8/1983 | Evans | 293/120 |
| 4,559,274 | 12/1985 | Kloppe et al. | 428/594 |
| 4,610,836 | 9/1986 | Wycech | 264/313 |
| 4,751,249 | 6/1988 | Wycech | 521/54 |
| 4,836,516 | 6/1989 | Wycech | 267/279 |
| 4,849,269 | 7/1989 | Grace | 428/119 |
| 4,853,270 | 8/1989 | Wycech | 428/68 |
| 4,861,097 | 8/1989 | Wycech | 296/188 |
| 4,901,500 | 2/1990 | Wycech | 52/793 |
| 4,908,930 | 3/1990 | Wycech | 267/279 |
| 4,922,596 | 5/1990 | Wycech | 29/897.2 |
| 4,923,902 | 5/1990 | Wycech | 521/54 |
| 4,978,562 | 12/1990 | Wycech | 428/35.8 |
| 4,995,545 | 2/1991 | Wycech | 228/119 |
| 5,122,398 | 6/1992 | Seiler et al. | 428/31 |
| 5,124,186 | 6/1992 | Wycech | 428/35.8 |
| 5,255,487 | 10/1993 | Weiting et al. | 52/728 |
| 5,320,896 | 6/1994 | Smith | 428/122 |
| 5,575,526 | 11/1996 | Wycech | 296/205 |
| 5,755,486 | 5/1998 | Wycech | 296/188 |

FOREIGN PATENT DOCUMENTS

| | | |
|---|---|---|
| 0 061 131 | 9/1982 | European Pat. Off. . |
| 0 414 302 A1 | 2/1991 | European Pat. Off. . |
| 0 453 77 A2 | 10/1991 | European Pat. Off. . |
| 29 19 046 | 11/1980 | Germany . |
| 90 11 147 U | 12/1990 | Germany . |
| 93 20 333 | 7/1994 | Germany . |
| 01069308 | 3/1989 | Japan . |
| 01069309 | 3/1989 | Japan . |
| 02206537 | 8/1990 | Japan . |
| 5389920 | 2/1993 | Japan . |
| 628868 | 3/1947 | United Kingdom . |
| 2061 196 | 5/1981 | United Kingdom . |
| 2197 267 | 5/1988 | United Kingdom . |
| WO 96/37400 | of 0000 | WIPO . |
| WO 89/06595 | 7/1989 | WIPO . |
| WO 93/05103 | 3/1993 | WIPO . |

*Primary Examiner*—Nasser Ahmad
*Attorney, Agent, or Firm*—Connolly Bove Lodge & Hutz LLP

[57] ABSTRACT

A hollow structural member is reinforced by a housing in the form of a framework exposed structural foam on the housing. The housing is placed in the structural member at an orientation with its longitudinal axis perpendicular to the longitudinal axis of the structural member so that the foam is disposed directly against opposed walls of the structural member. Upon curing the foam becomes intimately bonded to the opposed walls of the structural member and to the housing for reinforcing the structural member. Preferably the housing is formed by extrusion so that it can be cut to size across its extrusion axis.

10 Claims, 4 Drawing Sheets

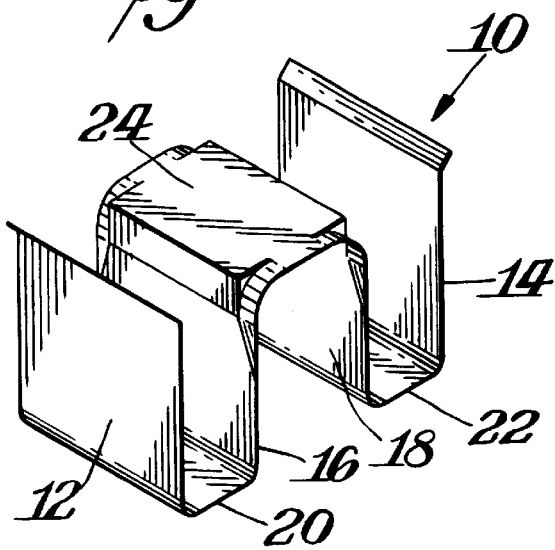
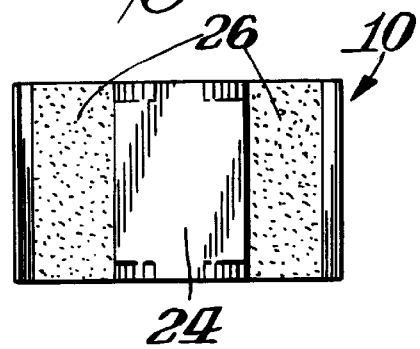
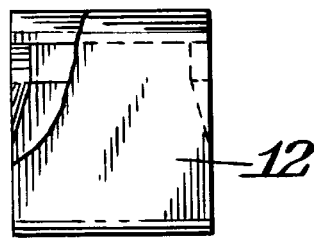
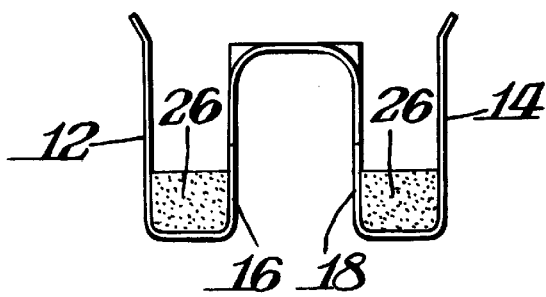
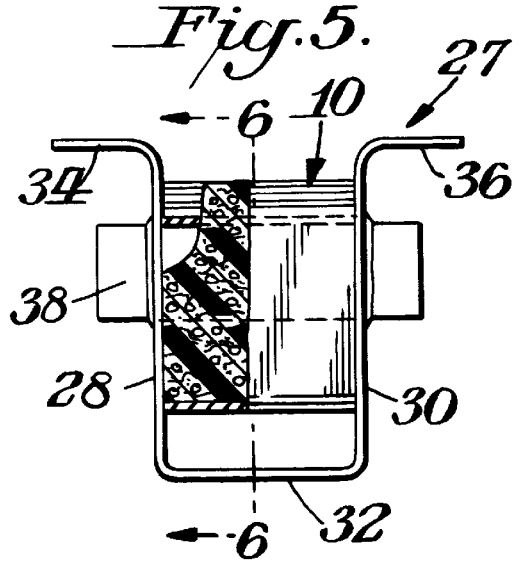
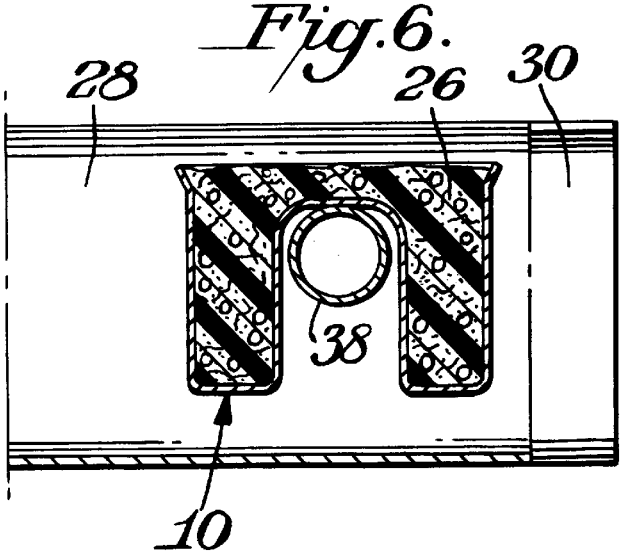

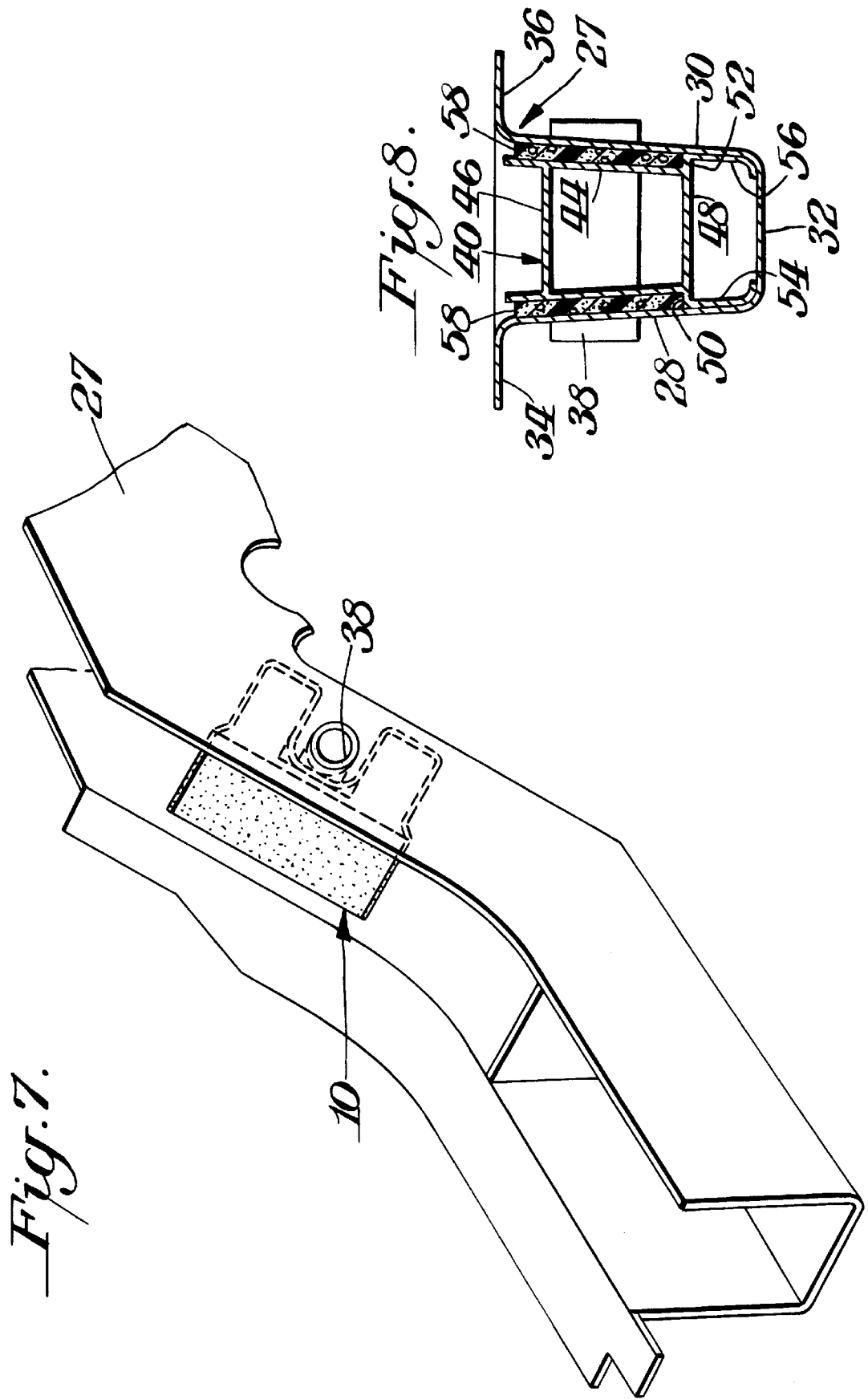

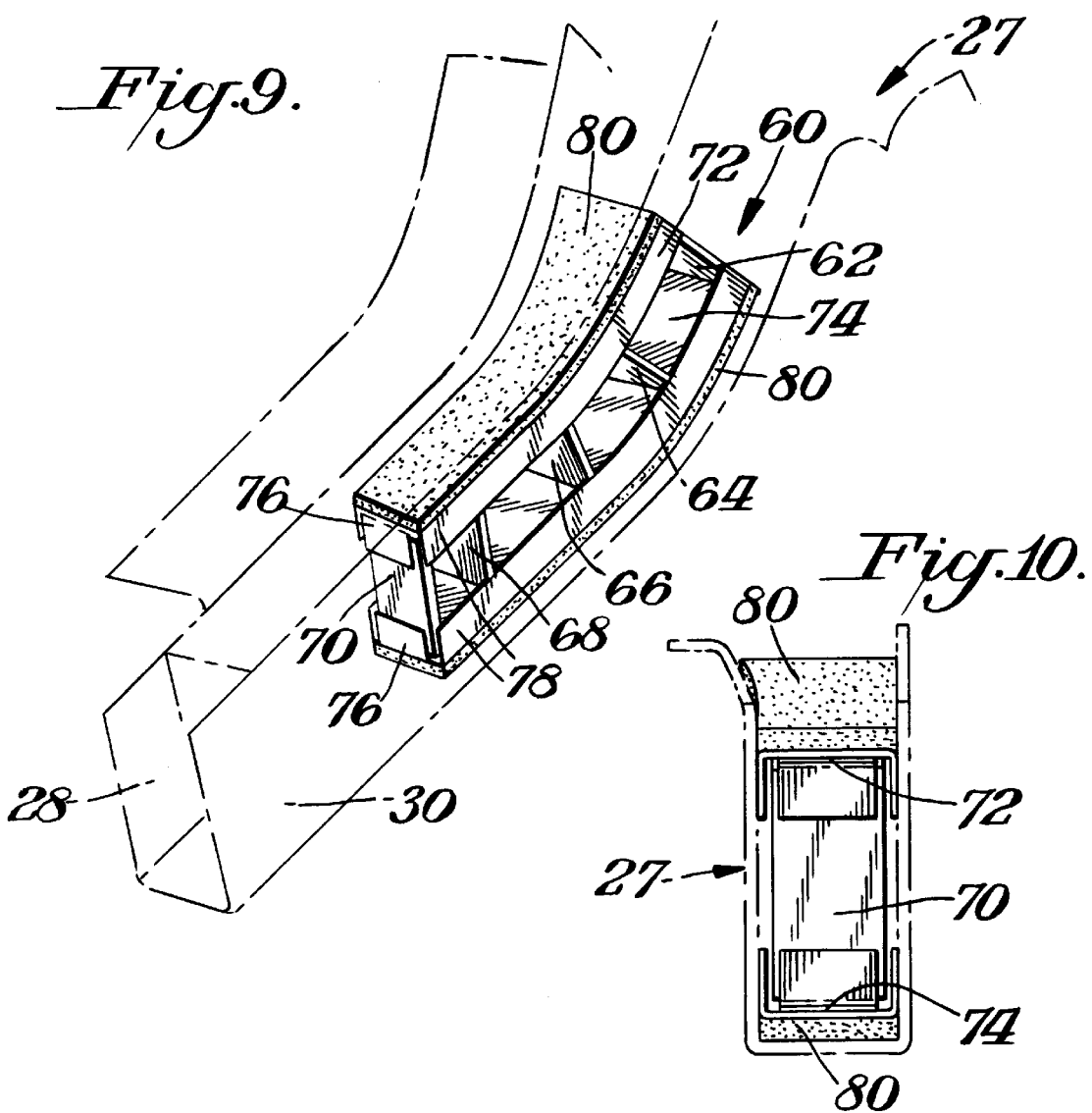

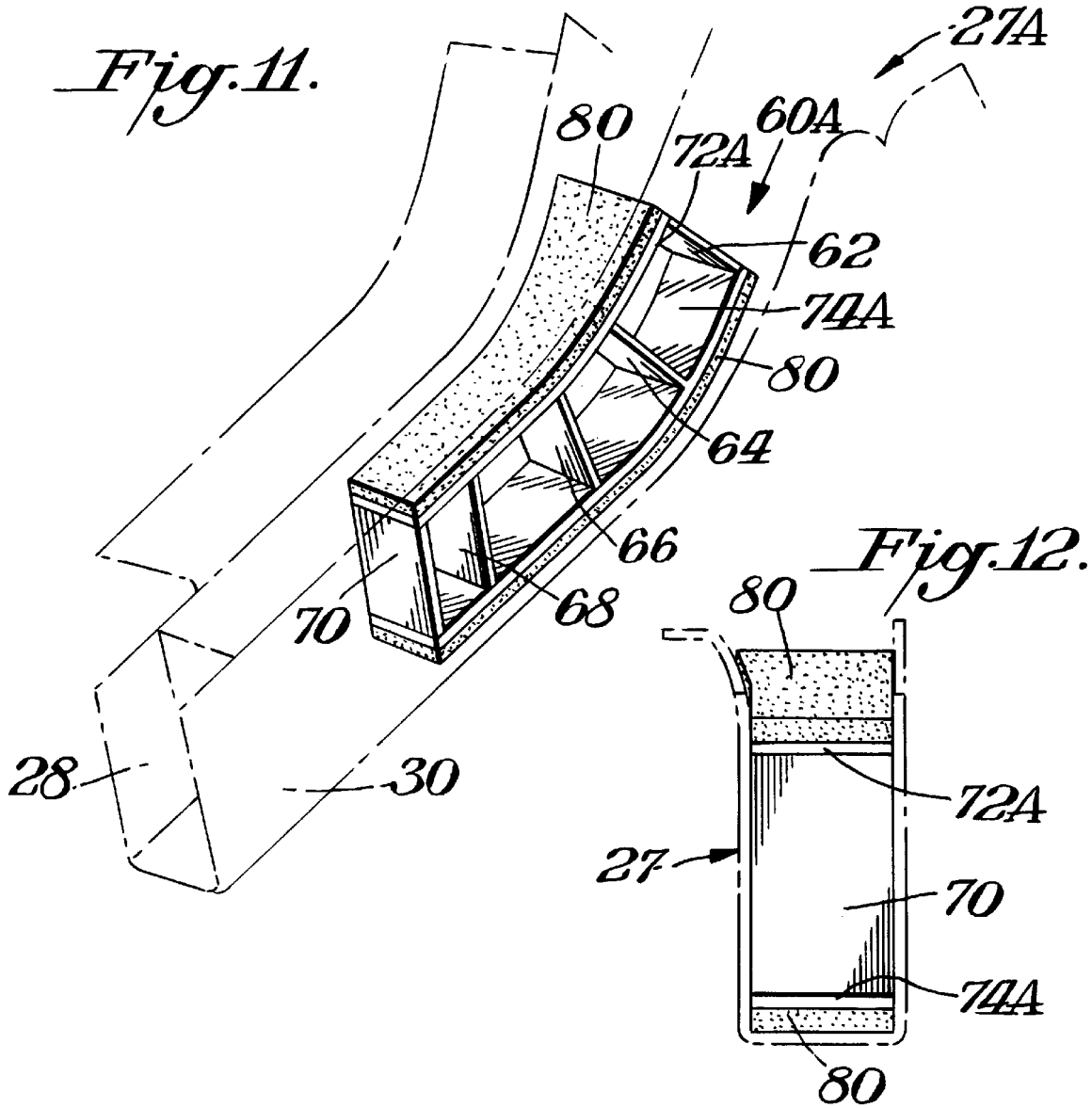

REINFORCEMENT OF HOLLOW SECTIONS USING EXTRUSIONS AND A POLYMER BINDING LAYER

BACKGROUND OF THE INVENTION

The present invention relates to methods and apparatus for reinforcing structural members, such as structural sections used as automotive components.

In a number of applications, particularly in the automotive industry there is a need for light-weight, high-strength structural members. Although structural members having these characteristics can be readily obtained through the use of various metal alloys, such as titanium alloys and the like, light-weight, high-strength alloys are generally cost prohibitive in automotive applications where weight reductions are closely balanced against the cost of materials. Moreover, reinforcement techniques are required which can be readily adapted to existing geometries of structural parts thereby eliminating the need for fundamental design changes and providing a means by which substandard design performance can be remedied. That is, in many instances, design deficiencies are discovered after the vehicle design has reached a stage at which radical changes are no longer feasible.

In addition, a significant amount of emphasis has been placed on performance characteristics of channel-shaped structural components which encounter forces that produce bending. Such structural components may be curved, hollow structural sections, such as automotive compartment rails or may be channel-shaped sections where two opposing section walls need to be secured together. My U.S. Pat. No. 5,575,926 discloses a composite laminate beam having an outer structural portion which is channel shaped and wherein an inner tube is disposed within the channel. A structural foam layer is bonded to the inner tube and the outer structural portion.

It would be desirable if techniques could be provided for providing sufficient reinforcement, particularly to curved hollow structural sections or to tie together two opposing sections.

SUMMARY OF THE INVENTION

An object of this invention is to provide a reinforced structure which meets the above needs.

A further object of this invention is to provide a method of reinforcing a channel-shaped structural member.

In accordance with this invention a reinforced structure comprises a channel shaped structural member and a reinforcement housing within the channel of the member. In one embodiment, the housing has a pair of opposite side walls with end walls being open. The axis of the housing which lies between the side walls and extends through the open end is perpendicular to the longitudinal axis of the channel. A structural foam is in the housing and is bonded to the side walls of the structural member and to the housing to provide support for the structural member at the location of the housing.

In one practice of the invention the structural member is a curved hollow section, such as an automotive compartment rail.

The housing is preferably made as an extrusion which has support walls which are wide and flat. The structural foam is preferably an expandable polymer layer that is bonded to the housing support walls and upon expansion becomes bonded to the side walls of the structural member to tie the extrusion and structural member together. By having the housing as a drop-in part, it is possible to customize the shape of the housing for being placed at any desired location in the structural member.

In an alternative embodiment of the invention a hollow frame is provided to serve as a mounting structure for the foam layer. The frame is free of barriers or side walls along the sides of the foam that are disposed toward the side walls of the structural member so that the structural foam could be bonded directly to the side walls of the structural member.

THE DRAWINGS

FIG. 1 is a perspective view of a reinforcement housing in accordance with one embodiment of this invention;

FIG. 2 is an end elevational view of the housing shown in FIG. 1;

FIG. 3 is a side elevational view of the housing shown in FIGS. 1–2;

FIG. 4 is a top plan view of the housing shown in FIGS. 1–3;

FIG. 5 is an end elevational view showing the housing of FIGS. 1–4 mounted in a structural member;

FIG. 6 is a cross-sectional view taken through FIG. 5 along the line 6—6;

FIG. 7 is a perspective view showing a curved structural member incorporating the housing of FIGS. 1–4;

FIG. 8 is a cross-sectional view in elevation showing a modified form of housing mounted in a structural member in accordance with this invention;

FIG. 9 is a view similar to FIG. 7 showing yet another form of housing in accordance with this invention;

FIG. 10 is an end elevational view of the reinforced structure shown in FIG. 9;

FIG. 11 is a view similar to FIG. 9 showing still yet another form of housing in accordance with this invention; and FIG. 12 is an end elevational view of the reinforced structure shown in FIG. 11.

DETAILED DESCRIPTION

Various structural members require reinforcement in order to properly function. A particular form of structural member would be one having hollow sections such as automotive compartment rails. It is particularly difficult to reinforce such rails in their curved sections. It would also be desirable to provide reinforcement for structural members having spaced walls by tying the two opposing section walls together even where the members are not curved.

In accordance with a preferred practice of this invention a housing is provided which may be an extrusion having the extrusion direction perpendicular or 90° to the main longitudinal axis of the rail or structural member being reinforced. This can be accomplished by having the reinforcement housing open at each end with the open ends disposed at the opposed side walls of the structural member. In this manner, the sub-elements or walls of the housing or extrusion become walls for a bulkhead of support for the structural member by having a polymer layer or structural foam bonded to the housing which also become bonded to the opposed walls of the structural member. Thus, the polymer layer is applied to the sides of the housing or extrusion which are wide and flat. The polymer layer upon curing ties the extrusion or housing to the main section or structural member through adhesion and entrapment.

The housing is preferably an aluminum or plastic extrusion which is simple to make and cut to become custom fit thereby eliminating hydra-forming or tube bending. The housing can be cut to a size to snugly fit in the structural member channel. This structure also optimizes use of the polymer layer. Reference is made to my U.S. Pat. No. 5,575,526 for examples of suitable reinforcement foam for polymer layer materials. It is to be understood that other structural foam may be used in accordance with this invention.

In general, the invention would be practiced by having the extrusion or housing in a form which could be simply dropped into the structural member particularly where the structural member is of open channel shape having a bottom wall and opposed side walls. The invention could be practiced by also inserting or dropping the housing into an open end wall of a tubular structural member and the polymer would bond to opposite wall portions of the tubular member. The invention may also be practiced where the hollow structural member is in the form of two spaced walls of separate is members wherein it is desired to provide a reinforcement in the spacing between the walls.

Prior to insertion of the housing, the polymer layer of structural foam would be bonded to support or mounting surfaces of the housing so that upon curing the structural foam then becomes bonded to the walls of the structural member. This results in an integral structure comprising the structural member and the housing and the structural foam with the opposed walls of the structural member being tied together by the intermediate structural foam.

FIGS. 1–4 illustrate a housing 10 in accordance with one embodiment of this invention. As shown therein housing 10 is an extrusion of generally W-shape having a pair of outer walls 12,14 spaced from a pair of inner walls 16,18 which are joined to the respective outer walls by bottom walls 20,22. The inner walls are joined together by top wall 24.

Structural foam 26 is provided in the two channels formed between the sets of walls 12,16 and 14,18. The opposite ends of housing 10 are open so that the foam 26 is exposed at these opposite open ends. In practice, as shown n FIGS. 5–6, the housing 10 with its polymer foam layers 26,26 is simply dropped into a hollow structural member in a direction perpendicular to the longitudinal axis of the structural member so that the open ends of the housing with its exposed foam are disposed against the side walls of the structural member. FIGS. 5–6, for example, show the structural member to be an automotive rail having a pair of opposed walls 28,30 joined together by a bottom wall 32 forming an open channel. Each wall 28,30 has an outwardly extending flange 34,36. A pin 38 extends through the opposed side walls 28,30. Housing 10 would be dropped in to the channel until the housing rests on pin 38. Alternatively, if housing 10 is long enough, it could be spaced from and straddle pin 38.

Although not illustrated, the outwardly extending flanges at the free ends of each wall 12,14 of housing 10 may include a pair of slits about one-third of the way inwardly of each edge to create a separate tongue at the center of each free end. The tongue could be bent inwardly directly above the channels holding foam 26. Upon the foam 26 expanding, the inwardly directed tongues would serve as anchor or bonding members for the foam.

Housing 10 may be cut to snugly fit within the spacing between walls 28,30 of structural member 27. The generally W-shape of housing 10 permits the housing to fit over pin 38 which would be disposed between side walls 16,18.

Foam 26 is an expandable foam. Thus, in its uncured and unexpanded state shown in FIG. 3 the foam occupies only a portion of the two channels formed between walls 12,16 and 14,18. Upon curing, the foam 26 expands and because of the open walls of housing 10 the foam 26 expands into contact with walls 28,30 of structural member 27 and becomes intimately bonded to the walls thus tying walls 28 and 30 together.

FIG. 7 shows the use of housing 10 in a tow board compartment rail located at the curved section of the rail 27.

Preferably, sufficient amount of foam 26 is used to completely fill housing 10. What is essential, however, is that there be sufficient foam to intimately bond to walls 28,30.

It is to be understood that while FIGS. 1–7 illustrate the housing 10 to be of generally W-shape other forms of housing such as an inverted U-shape could be used in accordance with the intended portion of the hollow structural member. A W-shape is particularly advantageous for accommodating pin 38.

FIG. 8 shows an alternative practice of the invention wherein a housing 40 may be extruded to provide an open structure. Housing 40 may, for example, be an aluminum extrusion which includes a pair of side walls 42,44 joined by bridge member 46 below the ends of the side walls with the bottom of the side walls joined by wall 48. Wall 48 extends outwardly beyond the side walls 42,44 to form a support extension 50,52 which then extends downwardly to form extensions 54,56 which fit snugly against walls 28,30 of rail or support member 27. Layers of foam 58 are bonded to walls 42,44 and the extensions or shoulders 50,52. Thus, the foam is disposed directly against walls 28,30 of support member 27 since housing 40 does not include any walls or barriers which would prevent direct contact of the foam layers 58,58 with the opposed walls 28,30. When foam 58,58 is cured the foam becomes intimately bonded to walls 28,30 as well as to reinforcement housing 40 thereby effectively reinforcing the structural member. As illustrated in FIG. 8 pin 38 extends through open areas of housing 40.

FIGS. 9–10 illustrate a further embodiment of this invention wherein the housing 60 is made of open framework which consists of a plurality of spaced walls 62,64,66,68,70 extending in generally the same direction and which would extend completely across the open channel of structural member 27 between opposing walls 28,30. Although five spaced walls are shown, a greater or lesser number could be used. Preferably there are at least three walls.

Each set of outer ends of walls 62,64,66,68,70 is interconnected by spaced transverse caps or support walls 72,74. Walls 72,74 may be secured to the frame formed by walls 62,64,66,68,70 in any suitable manner such as by welding for a permanent connection, or may be detachably secured by the later described flanges. The walls 72,74 may include outward extensions or flanges 76,78 which would be bent partially around the framework formed by walls 62,64,66, 68,70 for either a permanent or detachable securement.

Although not illustrated in FIG. 9 housing 60 is capable of accommodating a pin such as pin 38 which would extend, for example, between spaced walls 64 and 66. In order to accommodate the pin the housing might be inserted in two parts by first inserting the outer wall 74 below the pin and then dropping the remainder of housing 60 over the outer wall 74 so that the housing then assumes its completed structure shown in FIG. 9.

Alternatively and preferably, as shown in FIGS. 11–12, housing 60A may be extruded so that the support walls 72A,74A terminate at the edges of the walls 62,64,66,68,70. The extrusion axis is in the direction of walls 62,64,66,68, 70. Thus, the housing 60A could be cut to its desired size by cutting across the extrusion axis. Layers of foam 80 would be provided on each outer support wall 72A,74A to become intimately bonded to opposed walls 28,30.

As illustrated each housing has a bisecting axis which would be disposed in the same plane as the longitudinal axis of the channel between walls 28,30. Preferably, the housing is of identical structure on each side of its bisecting axis. Housing 10 also has a longitudinal axis along its extrusion axis which is perpendicular to its bisecting axis and perpendicular to the longitudinal axis of the structural member between walls 28,30. The housing may also be of identical structure on each side of its longitudinal axis. Foam is bonded to the housing each side of the bisecting axis for bonding to walls 28,30.

The invention may thus be practiced by, for example, reinforcing heavy steel reinforcement welded together. For example, because of a curved geometry it is difficult to reinforce the structural member properly due to the tendency of durability cracking. This occurs, for example, with truck cabs mounted on a frame by a heavy bracket wherein heavy bolts have been used to connect the walls together but the metal structural member cannot be properly reinforced. By use of the invention, an effective reinforcement results with a lightweight structure. Essentially all that is necessary is to drop in the housing or box having the exposed structural foam located toward the walls of the structural member so as to tie the walls together thereby avoiding localized stresses. The invention could be used, for example, with massive steering gear boxes which uses solid steel bushings dropped into the rail assembly. By forming the housing as an extrusion it is possible to readily manufacture the housing and to cut it to shape for a customized fitting in the structural member. Upon expansion the foam becomes bonded to the walls of the structural member thereby avoiding the need for heavy reinforcement.

In the preferred practice of this invention the structural member is a vehicle component made of metal. The invention, however, may be practiced for reinforcing other types of structural members in other types of environments. Thus, the structural member could be made of plastic or any material which could be intimately bonded to the structural foam.

The housing is preferably extruded from any suitable material, such as aluminum or glass filled nylon.

The invention may be practiced where the foam is not expandable or fully expandable by, for example, pumping the foam in place after the housing has been inserted into the structural member. Suitable structural foam material is disclosed in copending application Ser. No. 09/103,031, filed Jun. 23, 1998, the details of which are incorporated herein by reference thereto. As disclosed therein, the foam is preferably a resin-based material which incorporates hollow glass microspheres to reduce density. With specific reference now to the composition of foam layer, the density of the material should preferably be from about 20 pounds per cubic feet to about 40 pounds per cubic feet to minimize weight. The melting point, heat distortion temperature and the temperature at which chemical breakdown occurs must also be sufficiently high such that the foam layer maintains its structure at high temperatures typically encountered in paint ovens and the like. Therefore, the foam should be able to withstand temperatures in excess of 200 degrees C. and preferably 175 degrees C. for short times.

In one particularly preferred embodiment the foam layer includes a synthetic resin, glass microspheres, a blowing agent and a filler. The foam is preferably expanded in place between walls 28 and 30 and is prepared by blending together the following materials. A synthetic resin comprises from about 50 percent to about 80 percent by weight and more preferably from about 60 percent to about 75 percent by weight of the mixture used to form the foam. Glass microspheres comprises from about 10 to about 40 percent by weight and more preferably from about 15 to about 25 percent by weight of the mixture. A blowing agent comprises from about 1 to about 10 percent by weight and more preferably from about 2 to about 6 percent by weight of the mixture.

The foam is preferably initially applied in unexpanded form to the housing and then expanded into intimate contact with the walls 28,30 and thereby bonded to both the housing and the structural member. Where the foam is heat expandable and the structural member is a vehicle part, use could be made of the paint oven to initiate expansion of the foam, without requiring a separate heating step. Various fillers (such as fumed silica, calcium carbonate, milled glass fiber, and chopped glass strand) may be included. A filler comprises from about 1 percent to about 10 percent by weight and preferably from about 3 percent to about 8 percent by weight of the mixture used to form the foam.

Preferred synthetic resins for use in the present invention include thermosets such as epoxy resins, vinyl ester resins, thermoset polyester resins, and urethane resins. It is not intended that the scope of the present invention be limited by molecular weight of the resin and suitable weights will be understood by those skilled in the art based on the present disclosure. Where the resin is a thermoset resin, various accelerators, such as imidizoles and "DMP 30", and curing agents, preferably di-cyanamide, may also be included to enhance the cure rate. A functional amount of accelerator is typically from about 1 percent to about 3 percent of the resin weight with a corresponding reduction in resin, microspheres or filler. Similarly, the amount of curing agent used is typically from about 2 percent to about 8 percent of the resin weight with a corresponding reduction in resin, microspheres or filler. Effective amounts of processing aids, stabilizers, colorants, UV absorbers and the like may also be included in layer. Thermoplastics may also be suitable in some applications.

In the following tables, preferred formulations for use in forming the foam are described. All percentages in the present disclosure are percent by weight unless otherwise specifically designated.

| INGREDIENT | PERCENTAGE BY WEIGHT | | | |
|---|---|---|---|---|
| | FORMULA 1 | | | |
| One Part | Bisphenol A Epoxy | | 70% | |
| | Nipol Liquid Rubber | | 8% | |
| | Di-cy Curative | | 7% | |
| | EMI-24 Accelerator | | 1% | |
| | B38 Microspheres | | 14% | |
| | FORMULA II | | | |
| Two Part | Resin Side "A" | | Curative Side "B" | |
| | Epoxy Resin | 74% | Aliphatic Amine | 65% |
| | Celogen Blowing Agent | 6% | Thixotrope | 8% |
| | Thixotrope | 4% | K20 Microspheres | 27% |
| | K20 Microspheres | 16% | | |

It is to be understood that other structural foams may be used with the invention which would bond to both the structural member and the drop-in housing. The drop-in housing is preferably of open frame construction with a bisecting axis wherein there is identical housing structure on each side of the bisecting axis. Unless otherwise stated, the term "bisecting axis" does not require the housing to be of identical structure on each side of the bisecting axis. When the housing is dropped into the structural member, the bisecting axis is along the longitudinal axis of the structural member. The housing has a longitudinal axis perpendicular to its bisecting axis. Where the housing is extruded, its longitudinal axis is preferably the extrusion axis. The housing may also be symmetrical on each side of its longitudinal axis. Foam would be secured to the housing one each side of the bisecting axis exposed for direct contact with the spaced walls of the structural member to bond to the spaced walls.

I claim:

1. A reinforced structure comprising a structural member having a pair of spaced longitudinal side walls with a longitudinal axis between said side walls, a drop-in reinforcement housing having a bisecting axis and a longitudinal axis perpendicular to said bisecting axis, said drop-in housing being mounted in said structural member at an orientation wherein said longitudinal axis of said housing is perpendicular to said longitudinal axis of said structural member, structural foam on mounting surface structure in said housing on each side of said bisecting axis exposed to and in contact with said side walls of said structural member, said structural foam being bonded to said housing and to said side walls of said structural member to reinforce said structural member at the location of said housing, said structural member being channel-shaped with said side walls forming the walls of said channel and with said structural member having an open wall between said side walls, said housing being of identical structure on each side of said bisecting axis, said housing comprises an open framework formed by at least three spaced walls disposed in generally the same direction with respect to each other, a first cross wall spanning and mounted to said spaced walls, said first cross wall comprising said mounting surface structure, and said foam being on said first cross wall.

2. The structure of claim 1 including a second cross wall spanning and mounted to said spaced walls remote from said first cross wall, and said foam also being on said second cross wall.

3. The structure of claim 2 wherein said structural member is an automotive compartment rail having a curved portion, and said housing being located at said curved portion.

4. A reinforced structure comprising a structural member having a pair of spaced longitudinal side walls with a longitudinal axis between said side walls, a drop-in reinforcement housing having a bisecting axis and a longitudinal axis perpendicular to said bisecting axis, said drop-in housing being mounted in said structural member at an orientation wherein said longitudinal axis of said housing is perpendicular to said longitudinal axis of said structural member, structural foam on mounting surface structure in said housing on each side of said bisecting axis exposed to and in contact with said side walls of said structural member, said structural foam being bonded to said housing and to said side walls of said structural member to reinforce said structural member at the location of said housing, said structural member being channel-shaped with said side walls forming the walls of said channel and with said structural member having an open wall between said side walls, said housing being of identical structure on each side of said bisecting axis, said foam comprising pair of spaced layers, said housing being of open frame structure including a pair of spaced side walls each of which has an outwardly extending shoulder, and said foam being positioned on said respective set of side wall and shoulder.

5. A reinforced structure comprising a structural member having a pair of spaced longitudinal side walls with a longitudinal axis between said side walls, a drop-in reinforcement housing having a bisecting axis and a longitudinal axis perpendicular to said bisecting axis, said drop-in housing being mounted in said structural member at an orientation wherein said longitudinal axis of said housing is perpendicular to said longitudinal axis of said structural member, structural foam on mounting surface structure in said housing on each side of said bisecting axis exposed to and in contact with said side walls of said structural member, said structural foam being bonded to said housing and to said side walls of said structural member to reinforce said structural member at the location of said housing, said housing comprising an open framework formed by at least three spaced walls disposed in generally the same direction with respect to each other, a first cross wall spanning and mounted to said spaced walls, said first cross wall comprising said mounting surface structure, and said foam being on said first cross wall.

6. The structure of claim 5 including a second cross wall spanning and mounted to said spaced walls remote from said first cross wall, and foam being on said second cross wall.

7. The structure of claim 6 wherein said at least three walls includes five walls, and said housing being of identical structure on each side of said bisecting axis.

8. The structure of claim 6 wherein said structural member is an automotive compartment rail in the form of a channel having an open top, said rail having a curved portion, and said housing being located at said curved portion.

9. A reinforcement housing comprising an open framework formed by at least three spaced walls disposed in generally the same direction with respect to each other, a first cross wall spanning and mounted to said spaced walls, said first cross wall comprising a first mounting surface, structural foam being on and bonded to said first cross wall, a second cross wall spanning and mounted to said spaced walls remote from said first cross wall to comprise a second mounting surface, at least two of said spaced walls being in a non-parallel orientation with respect to each other, said first cross wall and said second cross wall being non-planar, one of said cross walls being of greater length than the other of said cross walls, and structural foam being on and bonded to said second cross wall.

10. The housing of claim 9 wherein said housing is made from extruded material.

* * * * *